2,807,552

METHOD OF PREPARING A SILICATE PAINT VEHICLE

Edward A. Robinson, South Euclid, and Carl W. Fuller, Jr., Painesville, Ohio, assignors to Diamond Alkali Company, Cleveland, Ohio, a corporation of Delaware No Drawing. Application April 17, 1953, Serial No. 349,546

4 Claims. (Cl. 106—74)

This invention relates to a silicate paint vehicle, and more particularly relates to an improved method of manufacture of such a vehicle which permits ordinary processing steps to be employed and eliminates the high criticality of mixing techniques which heretofore has inhibited the usefulness of such a composition.

Alkaline silicate solutions containing dispersed silica sols or silicic acid have been proposed and used for many years as paint vehicles. When properly prepared, these materials are subject to being combined with various pigments, surface extenders, coating compositions, and the like and produce satisfactory paints, especially for cement, plaster, and masonry surfaces and the like but are useful on other types of surfaces requiring protection. Either interior or exterior surface protecting compositions may readily be prepared from a silicate base vehicle.

The prior art proposals have envisioned the production from a silicate solution of a quantity of a silica sol or silicic acid solution, followed by the combination of additional silicate with the silica sol or silicic acid solution, to produce a paint vehicle. If properly prepared, such a material, when spread on a surface, dries rapidly to a continuous insoluble film and thus affords surface protection. The prior art disclosures have included the thought of acidifying a silicate solution by addition of a strong mineral acid thereto, followed by the addition to that composition of further silicate solution.

The prior art, however, has faced the disability that upon the addition of a strong mineral acid to a silicate solution of any practical dilution, the formation and precipitation of silica in the form of lumps in the solution can scarcely be avoided except by the most careful mixing techniques and controls which normally are above the expense which such an inexpensive product will stand. Even if such precipitation is avoided on the first step of adding acid to the silicate, the addition of further silicate to the acidified solution similarly causes precipitation of insoluble silica lumps, whereby homogeneous silicic acid containing solution is not obtained. Prior art proposals for preparing such paint vehicles have encountered so much waste in loss of material when such lumping occurs upon the addition of the acid or on subsequent addition of further silicate, that the silicate paint vehicle has for the most part not enjoyed the general use which its inexpensiveness and value as a surface covering should permit.

The prior art has proceeded without full understanding that between a pH of about 3 and about 9, it is practically impossible to avoid precipitation of lumps of silica in systems of this type. The present invention takes full advantage of this fact and thus is able readily to prepare a silicate paint vehicle by a method which is easily practiced and certainly reproducible.

An object of this invention is to provide an improved method of preparing a silicate paint vehicle which may be practiced in ordinary vessels and with ordinary mixing means and which requires no highly specialized type of production control.

A further object of the invention is to provide for the acidification of a silicate solution in a manner which prevents the formation in the silicate solution of lumps of $SiO_2$ but rather enhances the production of a silica sol comprising silicic acid, which silica sol may subsequently be treated with further silicate to form a paint vehicle.

Another object of the invention is to provide a method for the production of a silicate paint vehicle at pH's wholly outside the range of about 3 to 9.

A further object of the invention is to avoid the passage of the system through a pH range wherein the precipitation of $SiO_2$ almost inevitably takes place.

Additional objects and advantages of the invention will appear from the details of the description following.

In accordance with the invention, a silicate solution, which may be any alkali metal silicate solution, such as lithium, sodium, potassium, rubidium or cesium, but preferably potassium or sodium silicate, the former having certain advantages in producing a non-blooming type of silicate paint vehicle and the latter having the advantage of inexpensiveness, is employed. The ratio of alkali oxide to $SiO_2$ in the silicate molecule employed may vary from 1:2.25 to 1:3.9, an especially advantageous range being from 1:3.25 to 1:3.9, it being noted that more highly alkaline silicates, while of use, nevertheless simply require more acid and produce no better paint vehicle than the more highly siliceous silicates which are preferred. Silica sols or silicic acid may suitably be produced in such a silicate by adding the silicate solution to a solution of a suitably diluted strong mineral acid, of which phosphoric, sulfuric, nitric and hydrochloric acid are examples and of which hydrochloric acid is preferred both for cheapness and because the salt produced in the solution is ultimately of some benefit in a silicate paint vehicle.

It will be noted particularly in contrast to the prior art that the device of adding the alkaline (pH 11+) silicate solution to the acid (pH below 1) avoids taking the silicate solution through the pH range of approximately 3 to 9, in which range precipitation of $SiO_2$ is almost certain to occur. Upon the addition of the siliceous material to the acid, the pH of the acid is modified from below 1 to about 3, whereby the dangerous range of 3 to 9 is avoided, or if indeed the silicate is momentarily exposed to that range, it passes through it so fast that insoluble silica lumps do not precipitate and instead the desired silica sol or $H_2SiO_3$ forms.

Upon the completion of addition of sufficient silicate to the acid to form a solution comprising a silica sol or $H_2SiO_3$ and at a pH of about 3, this acidified silicate solution is slowly added with stirring to additional silicate of the same ratio of alkali oxide to $SiO_2$, which additional silicate has a pH of 11+. Again, the dangerous range of pH 3 to 9 is avoided by adding the acid to the main body of alkaline silicate solution so that the precipitation of $SiO_2$ lumps does not take place and a silica sol comprising $H_2SiO_3$ dissolved in alkali metal silicate is thus obtained and comprises the desired paint vehicle.

Employing the technique of the present invention, i. e., the avoidance of the passage of the alkali metal silicate through the dangerous pH range upon acidification, or upon adding the acidified silicate to the main body of alkaline silicate, the silicate paint base may be formed in various solutions, though it has been found preferable in general to operate with solutions of silicate wherein the ratio of alkali oxide to $SiO_2$ is as stated above in relatively high dilution and to dilute the acid to which the initial silicate solution is added in the same manner, to produce an initial mixture of dilute silicic acid which is a well dispersed sol of silica. Thereupon, the acidified silicate may be added to an additional quantity of alkali metal silicate solution which need not be in such high dilution but may be an ordinary solution of commerce, such as a solution having a specific gravity from 40° to 45° Bé.

The present invention, therefore, contemplates the improved method of compounding a base for a silicate paint, which includes the acidification of an alkali metal silicate solution by adding the same to a solution of a strong mineral acid, while maintaining a pH below 3, the combined solutions being suitably diluted to provide a proper ultimate consistency. The thus-formed silicic acid sol is added to further alkaline silicate, the pH being maintained above 9, whereby an alkaline solution of silicic acid is obtained which may be stored for reasonable periods of time and used as needed to combine with other pigments and other paint materials.

In general, it has been found that silicate solutions with 3 or more molecules of silica are preferred for preparation into silicate paint vehicles and, moreover, the ultimate vehicle is preferred to have a specific gravity of not more than 24° Bé. The method of the present invention readily adapts itself to these conditions.

For ease in operation with the materials to be employed, it has been found preferable, using, for example, a 42° Bé. silicate having a ratio of alkali metal oxide to $SiO_2$ of the order of 1:3, to dilute the silicate solution with about 10 parts more or less by weight of water and then to add the same to an acid solution, for example, 35% commercial hydrochloric acid diluted with 10 volumes of water, the addition being done with high speed mixing and with the silicate being added relatively slowly so that complete mixing occurs. Upon the completion of addition of silicate to the acid, the pH of the mixture is found to be of the order of 3 and comprises a completely soluble silica sol. Thereupon, this mixture is added to a volume of alkali metal silicate equal to substantially the volume of the acidified silicic acid solution with good stirring and produces a solution of the silica sol having a pH of the order of about 10.5–11.0 and having the silica in completely soluble form.

The opposite prior art method of preparing this base has been to add the acid to the silicate solution, and no matter the dilution or the efficiency of the stirring operation, it has been found that more than half of the time insoluble $SiO_2$ is precipitated by the addition of acid to the silicate. The prior art further teaches the addition of additional alkaline silicate to the acidified solution, thus passing through the pH range of 3 to 9, again with consequent precipitating of silica. The advantage of the present invention is in the avoidance of this precipitation of the insoluble silica.

In order that those skilled in the art may more fully understand the invention and the preferred method of its practice, the following specific examples are offered:

EXAMPLE I

*Silicate paint vehicle*

44.7 parts by weight of 42° Bé. silicate, wherein the ratio of $Na_2O:SiO_2$ is 1:3.22, are diluted with 315 parts by weight of water. This is mixture 1. 15.35 parts by weight of 35% HCl are diluted with 133 parts by weight of water in an acidproof tank. This is mixture 2. Mixture 1 is slowly added to mixture 2 in the acidproof tank with efficient stirring to assure adequate mixing at the time of contact. This produces mixture 3. When mixture 3 is completed, it is added to 492 parts by weight of 42° Bé. sodium silicate solution ($Na_2O:SiO_2$ 1:3.22) with thorough agitation during the addition. This is the paint vehicle. It may be stored indefinitely and used as the base for a silicate paint.

EXAMPLE II 178.8 parts by weight of sodium silicate solution, wherein the ratio of $Na_2O:SiO_2$ is 1:3.22 and of a specific gravity of 42° Bé., are diluted with 1060 parts by weight of water. In a second tank, which is of acidproof construction, 61.2 parts by weight of 35% HCl are diluted with 532 parts by weight of water to give a solution of about 3.5% HCl. The diluted silicate solution is now added with thorough agitation to the diluted acid solution and 200 parts by weight of water are added, following this addition, again with good agitation, the 200 parts by weight of water having formerly been used to wash the diluted silicate tank. The acidified silicate mixture is now added to 1968 parts by weight of 42° Bé. silicate, wherein the ratio of $Na_2O:SiO_2$ is 1:3.22, the addition being made slowly to prevent gelling of the solution. Upon completion, this mixture, which comprises a sodium silicate solution of silicic acid having a pH of the order of about 10.5 to 11, may be stored indefinitely and employed as a base for silicate paint.

EXAMPLE III

This and the following example are offered for completion as they do not form a part of the present invention, in that no claim is made herein to the silicate paints themselves as they are well-known in the art.

312 parts by weight of the silicate vehicle of Example I or II are combined with 145 parts by weight of lithopone and 145 parts by weight of magnesium silicate, the whole being mixed thoroughly. The mixture is ground through a high speed stone mill and added to 67 parts by weight of latex emulsion with constant stirring to avoid the breaking of the emulsion. This formula produces a white paint having excellent covering power and being especially efficient when applied to masonry surfaces and the like.

EXAMPLE IV

An example of a dark-green silicate paint is as follows; all parts are by weight:

25 parts bone black
175 parts pure chromium oxide
206 parts magnesium silicate
675 parts silicate paint vehicle prepared in accordance with Example I or II.
145 parts latex emulsion
1 part non-ionic wetting agent If other colors are desired, the following pigments may be employed, though it will be appreciated by those skilled in the art that others are available for use:

Red_____Lime-Free Iron Oxide.
Blue_____Ultramarine Blue.
Yellow_____Yellow Iron Oxide, Hansa Yellow.
Brown_____Burnt Umber or Synthetic Iron Oxide.
Black_____Grease-Free Lamp Black or Bone Black.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In a method for preparing a silicate paint vehicle, which includes the reaction of an alkali metal silicate to form silicic acid and the combination therewith of further alkali metal silicate, the improvement which comprises diluting an alkali metal silicate with water and adding this dilute silicate solution to a sufficient quantity of strong mineral acid to produce a silica sol, maintaining said acid solution at a pH below 3 at all times during the addition, adding said acid solution to a solution of alkali metal silicate while maintaining the pH of said solution of alkali metal silicate at all times during the addition, at a pH above about 9.

2. In the method of preparing a silica paint vehicle, which includes acidifying an alkali metal silicate and combining the acidified silicate with further alkali metal silicate, the steps of adding a diluted aqueous solution of an alkali metal silicate to a strong mineral acid, while maintaining at all times the pH of the body of the combined solutions below 3, to form a silicic acid sol in the resulting mixture, and adding said mixture to further alkali metal silicate solution while maintaining at all times the pH of said further alkali metal silicate solution above 9 during the latter addition, to form an alkaline solution thereof.

3. The method of forming a silicate paint vehicle, which includes the steps of adding a diluted aqueous sodium silicate solution, wherein the ratio of $Na_2O:SiO_2$ is at least 1:3, to a solution of a strong mineral acid, while maintaining at all times the pH of the body of the combined solutions below approximately 3, to form a silica sol in acid solution, and thereupon adding the mixture of said sol and said acid solution to further sodium silicate solution of the same $Na_2:SiO_2$ ratio, while maintaining at all times the pH of said further silicate solution at a value above 9, during the addition of said mixture.

4. In the method of making a silicate paint vehicle, the improvement which includes the steps of diluting an alkali metal silicate solution of approximately 42° Bé. gravity and having an alkali metal oxide to silica ratio of 1:3.22 with approximately 10 parts by weight of water, adding this dilute solution of silicate to a solution of about 3.5% concentration hydrochloric acid with agitation while maintaining at all times the pH of said acid solution below 3, and adding the already acidified solution to a body of alkali metal silicate solution having an $Na_2O:SiO_2$ ratio of 1:3.22 and a specific gravity of about 42° Bé. while maintaining at all times the pH of said body of said silicate solution at a value above 9.

References Cited in the file of this patent

UNITED STATES PATENTS

| | | |
|---|---|---|
| 593,670 | Lawton et al. | Nov. 16, 1897 |
| 2,588,389 | Iler | Mar. 11, 1952 |

FOREIGN PATENTS

| | | |
|---|---|---|
| 2,645 | Great Britain | 1862 |
| 2,844 | Great Britain | 1889 |
| 191,426 | Great Britain | 1923 |

OTHER REFERENCES

Page 1114 of Alexander's Colloid Chemistry, vol. VI, 1946.

UNITED STATES PATENT OFFICE

CERTIFICATE OF CORRECTION

Patent No. 2,807,552 September 24, 1957

Edward A. Robinson et al.

It is hereby certified that error appears in the printed specification of the above numbered patent requiring correction and that the said Letters Patent should read as corrected below.

Column 5, line 19, for "$Na_2:SiO_2$" read --$Na_2O:SiO_2$--.

Signed and sealed this 10th day of December 1957.

(SEAL)
Attest:

KARL H. AXLINE
Attesting Officer

ROBERT C. WATSON
Commissioner of Patents